United States Patent

[11] 3,617,233

[72] Inventor Eustace H. Mumford
 Ottawa Lake, Mich.
[21] Appl. No. 823,042
[22] Filed May 8, 1969
[45] Patented Nov. 2, 1971
[73] Assignee Owens-Illinois, Inc.
 The portion of the term of the patent subsequent to Oct. 14, 1986, has been disclaimed.

[54] GLASS-FORMING MACHINE
 4 Claims, 4 Drawing Figs.
[52] U.S. Cl. ................................................. 65/307, 65/357, 65/359, 65/360, 65/235, 65/323
[51] Int. Cl. .........................................................C03b 11/00, C03b 9/00
[50] Field of Search.......................................... 65/361, 359, 360, 235, 307, 357, 323

[56] References Cited
UNITED STATES PATENTS

| | | | |
|---|---|---|---|
| 2,006,056 | 6/1935 | McNamara.................. | 65/360 |
| 2,307,563 | 1/1943 | Bridges....................... | 65/360 |
| 2,949,701 | 8/1960 | Olson et al.................. | 65/361 X |
| 3,147,105 | 9/1964 | Abbott et al................ | 65/361 |
| 3,180,720 | 4/1965 | Kawecka..................... | 65/359 |
| 3,233,999 | 2/1966 | Mumford..................... | 65/361 X |
| 3,244,499 | 4/1966 | Wiley.......................... | 65/361 X |
| 3,434,820 | 3/1969 | Zappia et al................ | 65/361 X |

Primary Examiner—Frank W. Miga
Attorneys—D. T. Innis and E. J. Holler

ABSTRACT: A glass-forming machine wherein a plurality of charges of glass are delivered to parison molds at a parison-molding station, formed into parisons at said station and thereafter transferred by neck rings to a blow mold station wherein the parisons are blown to desired shape.

PATENTED NOV 2 1971
3,617,233
SHEET 2 OF 3
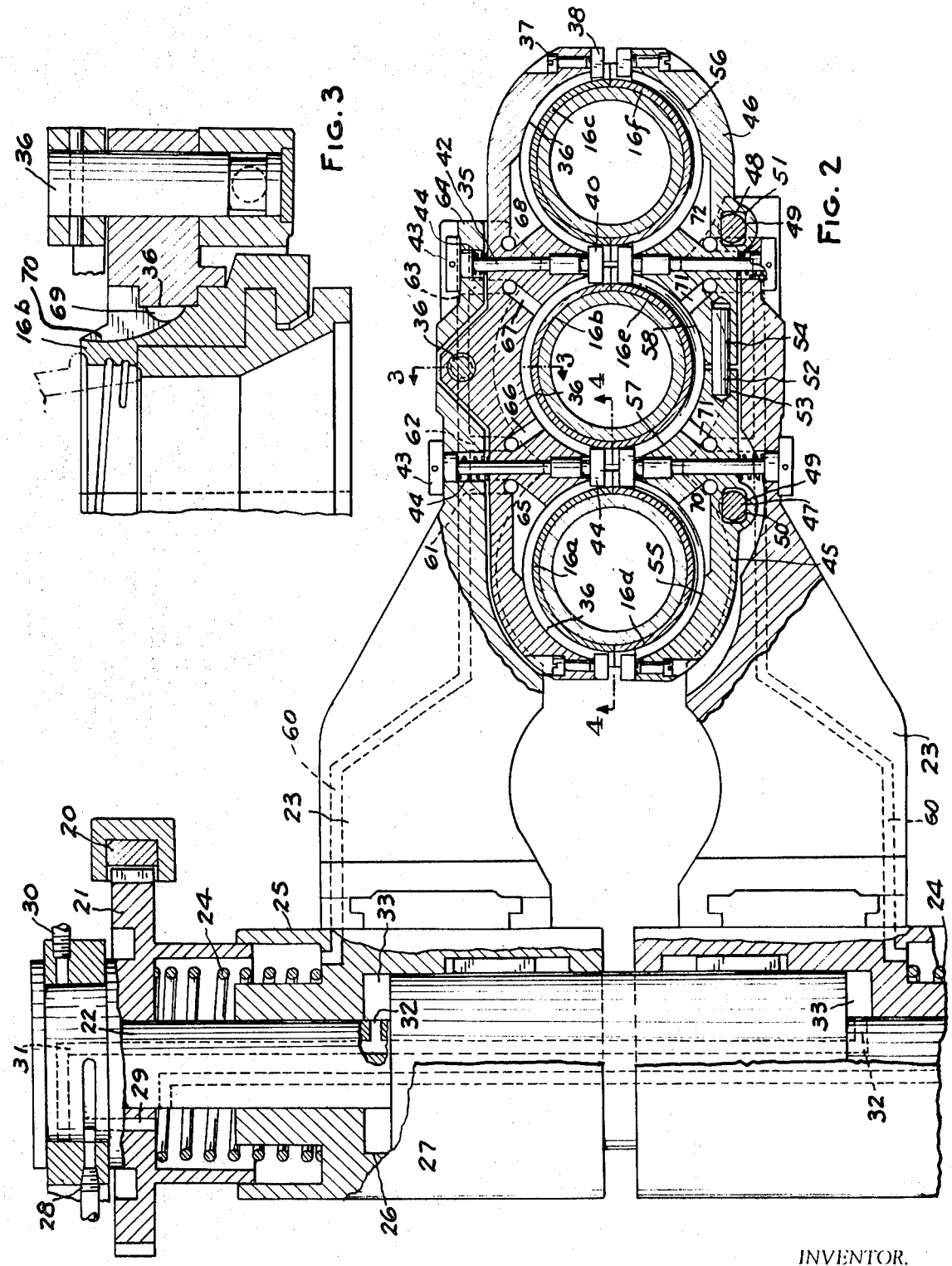
INVENTOR.
EUSTACE H. MUMFORD
BY
ATTORNEYS

GLASS-FORMING MACHINE

BACKGROUND OF THE INVENTION

In a type of glass-forming machine referred to commonly as an individual section machine, such as shown in the U.S. Pat. to Ingle No. 1,911,119, a charge of glass is delivered to a parison mold at a parison-molding station, is formed into a parison by blowing or pressing at the parison-molding station, and is thereafter transferred by neck rings to a blow mold station by an inverting movement where the parison is formed into the final shape by blow molding.

In an effort to increase production, it has been heretofore suggested that a plurality of charges be simultaneously delivered to a plurality of parison molds at the parison-molding station. One of the problems with respect to such an apparatus is that there may be a tendency for the neck rings to close in an uneven fashion so that imperfect glass articles are made.

Accordingly, among the objects of the invention are to provide a glass-forming machine which incorporates a novel neck ring support structure that obviates the disadvantages heretofore discussed; which machine is relatively simple, easy to maintain, and which can be adapted from present machinery.

SUMMARY OF THE INVENTION

A glass-forming machine wherein a plurality of charges of glass are delivered to parison molds at a parison-molding station, formed into parisons at said station and thereafter transferred by neck rings to a blow mold station wherein the parisons are blown to desired shape. The neck ring support structure comprises a pair of neck ring arms which are movable toward and away from one another and may be swung between the blow-molding station and the parison-molding station. One of the arms carries a neck ring support having three neck ring halves mounted thereon and the other of the arms carries a pair of neck ring supports, each of which supports a neck ring half and cooperates with the other to support a third neck ring half.

DESCRIPTION OF THE DRAWINGS

FIG. 2 is a fragmentary sectional view on an enlarged scale taken along the line 2—2 in FIG. 1.

FIG. 3 is a fragmentary sectional view on an enlarged scale taken along the line 3—3 in FIG. 2.

DESCRIPTION

Figure 1:
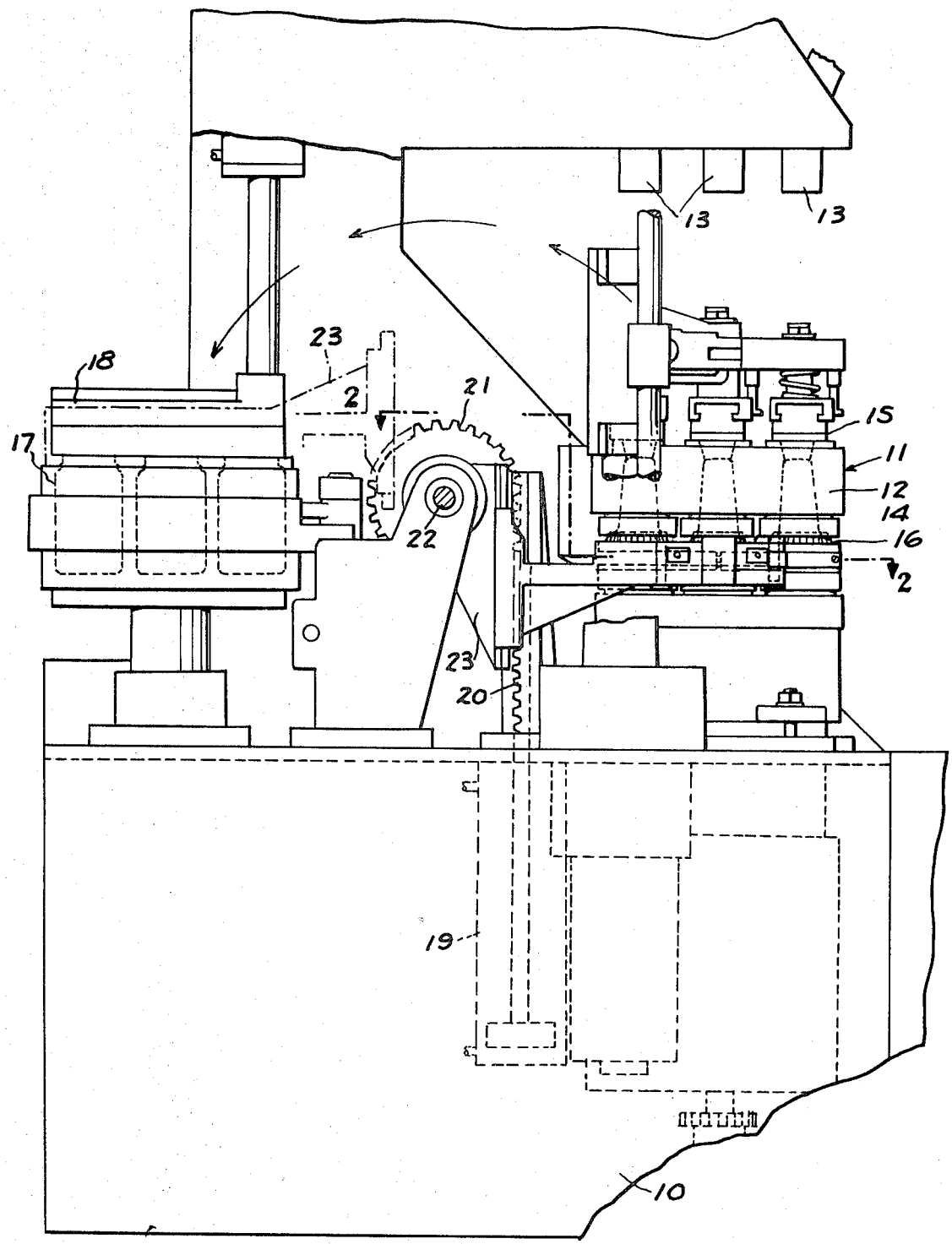
FIG. 1 is a partly diagrammatic side elevational view of a glass forming machine embodying the invention.

Referring to FIG. 1, the glass-forming machine comprises a base 10 on which a parison mold assembly 11 having open ended parison molds 12 is mounted for movement into and out of position at a parison-molding station. A plurality of charges are delivered by chutes 13 to the parison molds 12 and formed into parisons by movement of plungers 14 upwardly to force the glass against the sides of the mold and against baffles 15. The formation of the parisons also forms the neck of the article against neck rings 16. After the parison is formed, the baffles are moved upwardly and horizontally, the parison mold assembly 11 is moved upwardly and transversely to strip the parisons from the parison molds and then the neck rings 16 are swung in unison to bring the parisons to the blow-molding station where blow molds 17 are closed about the parisons and a blow head 18 is brought into position to blow the parisons to a final shape. The neck rings 16 are swung between the parison-molding station and the blow-molding station by operation of a piston motor 19 which has a rack 20 on its shaft engaging a gear 21 which in turn rotates a shaft 22 to swing neck ring arms 23 about the axis of the shaft 22. The neck rings 16 are split and supported on the neck ring arms 23. The above-described construction is conventional.

In accordance with the invention as shown in FIG. 2, the neck ring support arms 23 are mounted for movement axially of the shaft 22 toward and away from one another. As shown springs 24 yieldingly engage brackets 25 on arms 23 and urge the arms 23 toward one another. The brackets 25 have cylindrical openings 26 cooperating with cylinders 27 fixed to the shaft 22 to form a piston motor. Fluid may be introduced to each piston motor through corresponding inlet 28 and passage 29 to urge the brackets 25 and in turn the arms 23 toward one another. Fluid may also be introduced through an inlet 30 which communicates with an axial passage 31 and transverse passage 32 to space 33 for moving the brackets 25 axially and in turn the arms 23 away from one another to open the neck rings.

Figure 4:
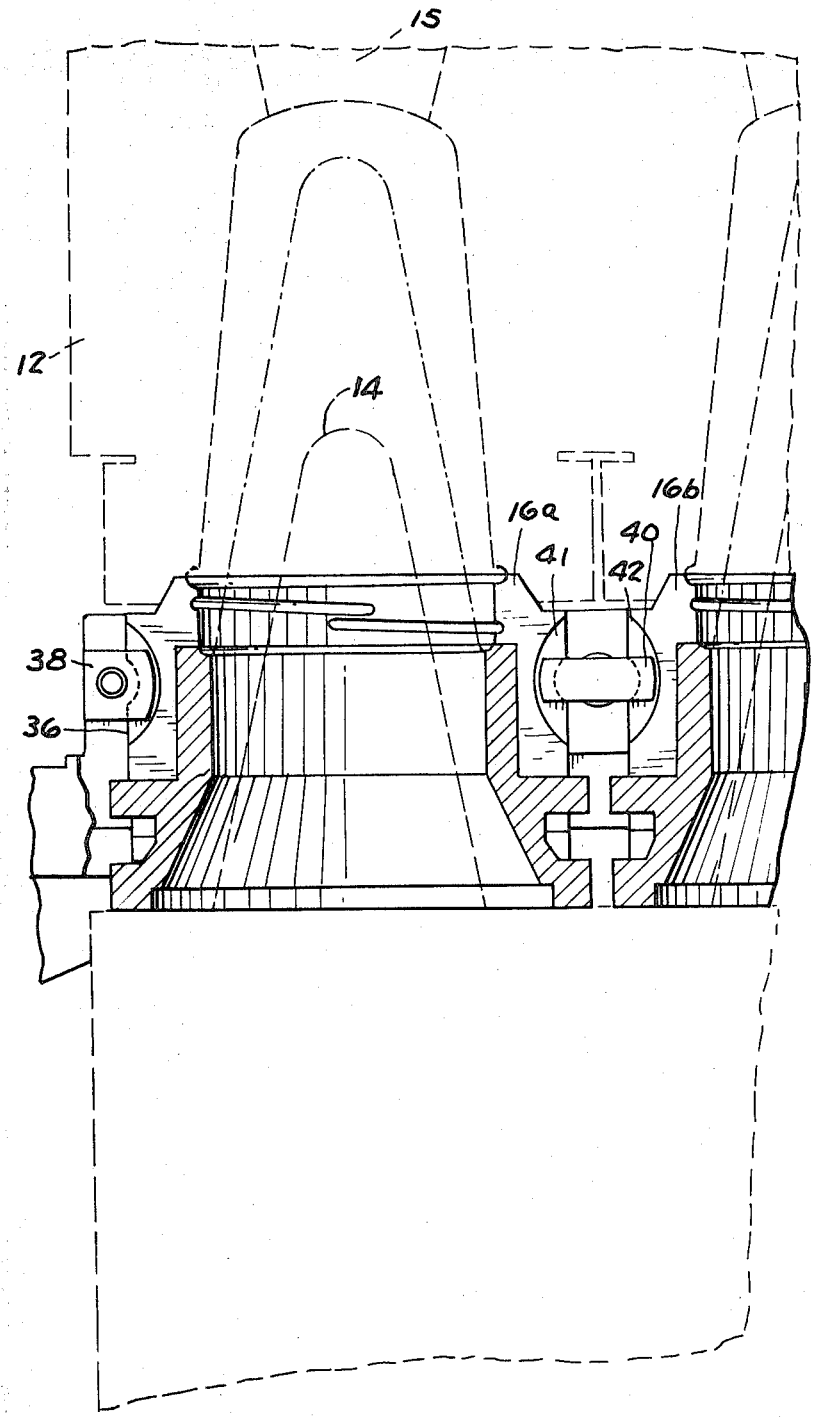
FIG. 4 is a fragmentary sectional view on an enlarged scale taken along the line 4—4 in FIG. 2.

As shown in FIG. 2, a neck ring support 35 is pivoted by a bolt 36' intermediate its ends to one of the arms 23. Support 35 includes semicircular openings or spaces 36 which receive neck ring halves 16a, 16b, 16c. One end of each of the outermost neck ring halves 16a, 16c is mounted in support 35 by a bolt 37 which is threaded into a stop 38 that engages a recess in the neck ring. The inner ends of the outermost neck ring halves 16a, 16c and of the centermost neck ring halves 16b are mounted by an arrangement which includes a neck ring lock member 40 which has engaged recesses 41, 42 in the neck ring halves 16a (FIG. 4). A knob 43 is pinned to the end of the member 42 and a spring 44 is interposed between the knob and the support 35 thereby performing the function of holding the neck ring half end in position.

Neck ring supports or segments 45, 46 are mounted on the other neck ring arm 23 in a manner wherein they can move longitudinally relative to each other by pins 47, 48 that have a noncircular cross section and particularly flats 49 that cooperate with complementary openings 50, 51. The supports 45, 46 are interconnected by a pin 52 that extends into slots 53, 54 so that there is limited permissible movement between the supports 45, 46 in a direction parallel to the axis of the pin 52 to accommodate any misalignment between the neck rings. The pin 52, which keeps the two neck mold support sectors 45 and 46 in general alignment, is press-fitted within the opening 53 in the sector 45 and the opening 54 in the sector 46 is somewhat larger than the pin 52 so that there is a certain amount of lateral movement of the two sectors 45 and 46 with respect to each other so that the clamping forces on the neck mold halves may be equalized on all three neck rings.

Supports 45, 46 have arcuate openings or recesses 55, 56 in which neck ring halves 16d, 16e, 16f are mounted in the same manner as the halves 16a, 16b, 16c are mounted in support 35. The supports further include openings 57, 58 that cooperate to receive the centermost neck ring 16b.

In practice, the neck ring halves 16a–16f are brought into clamping engagement with one another. The manner of mounting by pivoted support 35 and pivoted supports 45, 46 permits uniform clamping pressure provided between the neck ring halves. As shown in FIG. 4, the neck ring halves clamp about plunger guides 60.

As shown in FIG. 2, provision is made for cooling the neck ring halves and comprises a passage 60 in each arm 23 that extends from the interior of bracket 25 to provide cooling fluid to interconnecting passages 61, 62, 63, 64 in arm 23 which, in turn, supply fluid to the passages 65, 66, 67, 68 in support 35. The last-mentioned passages 65–68 communicate with an annular groove 69 in the periphery of each neck ring half (FIG. 3). The fluid is exhausted upwardly through exhaust groove 70 in each neck ring (FIG. 3) which extends from each groove 69 to the atmosphere.

I claim:

1. In a glass-forming apparatus comprising
a pair of neck ring arms,
means attached to said neck ring arms mounting them for movement toward and away from each other,
neck ring support means connected to one of said neck ring arms and defining at least three neck ring carrying pockets and
a two-segment neck ring support and equalizer means, each segment thereof defining at least one and one-half neck ring carrying pockets, means pivotally connecting said support and said equalizer segments to the other of said neck ring arms in a cooperating relationship to provide at least three adjacent neck ring carrying pockets, at least three pairs of complementary neck ring halves respectively mounted in the neck ring pockets defined by said means on the one neck ring arm and said equalizer means, each pair of complementary neck ring halves being in juxtaposed closed position upon movement of said neck ring arms toward each other to define a glass neck ring molding cavity, and means connected to said pair of neck ring arms for moving them toward and away from each other, the equalizer means, upon closing movement of the neck rings by said arms, applying equalized closing pressures to each of the said pairs of complementary neck ring halves.

2. The apparatus defined in claim 1 wherein the two segmented support equalizer means comprises first and second equalizer arms each defining at least one and one-half neck ring carrying pockets, each of said arms being mounted on rocking means connected to said other neck ring arm and longitudinally spaced thereon for applying equal closing forces to the neck ring halves carried thereon in engagement with the complementary neck ring halves on the said one neck ring.

3. The apparatus defined in claim 2 wherein the means connected to the one of said neck ring arms defining at least three neck ring carrying pockets comprises an equalizer support arm, a pin pivotally connecting the equalizer support arm on said one neck ring arm, the pin being longitudinally, centrally located with respect to the neck ring carrying pockets of said equalizer support arm.

4. The combination set forth in claim 1 wherein said neck ring arms, said support means and said support and equalizer means are provided with passages which are interconnected and extend to spaces surrounding the neck rings whereby cooling fluid can be directed through said passages to the spaces surrounding the neck rings.

* * * * *